(12) United States Patent
Hasegawa

(10) Patent No.: US 10,056,587 B2
(45) Date of Patent: Aug. 21, 2018

(54) ASSEMBLED BATTERY

(71) Applicant: Panasonic Intellectual Property Management Co., Ltd., Osaka (JP)

(72) Inventor: Takashi Hasegawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/504,009

(22) PCT Filed: Apr. 11, 2016

(86) PCT No.: PCT/JP2016/001963
§ 371 (c)(1),
(2) Date: Feb. 14, 2017

(87) PCT Pub. No.: WO2016/181608
PCT Pub. Date: Nov. 17, 2016

(65) Prior Publication Data
US 2017/0279096 A1 Sep. 28, 2017

(30) Foreign Application Priority Data

May 8, 2015 (JP) .................................. 2015-095449

(51) Int. Cl.
*H01M 2/00* (2006.01)
*H01M 2/10* (2006.01)
(Continued)

(52) U.S. Cl.
CPC ......... *H01M 2/1061* (2013.01); *H01M 2/204* (2013.01); *H01M 2/26* (2013.01); *H01M 2/30* (2013.01); *H01M 10/48* (2013.01)

(58) Field of Classification Search
CPC .... H01M 2/1061; H01M 2/204; H01M 10/48; H01M 2/30; H01M 2/26
See application file for complete search history.

(56) References Cited

U.S. PATENT DOCUMENTS

2010/0021802 A1\* 1/2010 Yang ................... H01M 2/0212
429/91
2012/0183840 A1 7/2012 Lee et al.
(Continued)

FOREIGN PATENT DOCUMENTS

| JP | 2014-502013 | 1/2014 |
|---|---|---|
| JP | 5552546 B | 7/2014 |
| WO | 2014/142293 | 9/2014 |

OTHER PUBLICATIONS

International Search Report of PCT application No. PCT/JP2016/001963 dated Jul. 12, 2016.

*Primary Examiner* — Cynthia Harris Kelly
*Assistant Examiner* — Monique M Wills
(74) *Attorney, Agent, or Firm* — McDermott Will & Emery LLP

(57) ABSTRACT

An assembled battery includes a cell stack formed by stacking a plurality of unit cells in the same direction, positive electrode-side bus bars respectively connected to positive electrode tabs of the unit cells, and negative electrode-side bus bars respectively connected to negative electrode tabs of the unit cells. A positive electrode-side bus bar connected to a positive electrode tab of a first unit cell of adjacent unit cells in the cell stack, and a negative electrode-side bus bar connected to a negative electrode tab of a second unit cell, are connected to each other on one of the surfaces of the cell stack.

13 Claims, 7 Drawing Sheets

(51) Int. Cl.
*H01M 2/20* (2006.01)
*H01M 2/26* (2006.01)
*H01M 2/30* (2006.01)
*H01M 10/48* (2006.01)

(56) References Cited

U.S. PATENT DOCUMENTS

2013/0122339 A1* 5/2013 Chae .................. B60L 11/1879
                                                              429/99
2013/0236761 A1   9/2013 Seong et al.

* cited by examiner

ASSEMBLED BATTERY

CROSS-REFERENCE TO RELATED APPLICATIONS

This application is a U.S. national stage application of the PCT International Application No. PCT/JP2016/001963 filed on Apr. 11, 2016, which claims the benefit of foreign priority of Japanese patent application No. 2015-095449 filed on May 8, 2015, the contents all of which are incorporated herein by reference.

TECHNICAL FIELD

The present disclosure relates to an assembled battery.

BACKGROUND ART

An assembled battery is formed by connecting a plurality of unit cells in series, in parallel, or in series-parallel by using a bus bar and the like. For example, Patent Literature 1 discloses an assembled battery in which use of a pair of bus bars including a series welding part and a parallel welding part achieves series connection between the cell units and parallel connection between the unit cells simultaneously.

CITATION LIST

Patent Literature

PTL 1: Japanese Patent No. 5552546

SUMMARY OF THE INVENTION

From the viewpoint of improvement of productivity, an assembled battery having a simple structure and being assembled easily has been demanded. Furthermore, an assembled battery is desired to have a structure, for example, having a small number of components, and a high degree of freedom of the connection mode of unit cells.

Solution to Problem

An assembled battery of one aspect of the present disclosure includes unit cells each including a flat main body, a positive electrode tab pulled out from a first end side in a lateral direction of a first surface of the main body, and a negative electrode tab pulled out from a second end side in the lateral direction of the first surface of the main body; a cell stack formed by stacking the unit cells facing in an identical direction; positive electrode-side bus bars each being connected to the positive electrode tab; and negative electrode-side bus bars each being connected to the negative electrode tab. In the assembled battery, in the unit cells that are adjacent to each other in the cell stack, the positive electrode-side bus bar connected to the positive electrode tab of a first unit cell of the unit cells and the negative electrode-side bus bar connected to the negative electrode tab of a second unit cell of the unit cells are connected to each other on a first surface of the cell stack.

One aspect of the present disclosure can provide an assembled battery which has a simple structure and is assembled easily.

DESCRIPTION OF EMBODIMENTS

Figure 1:
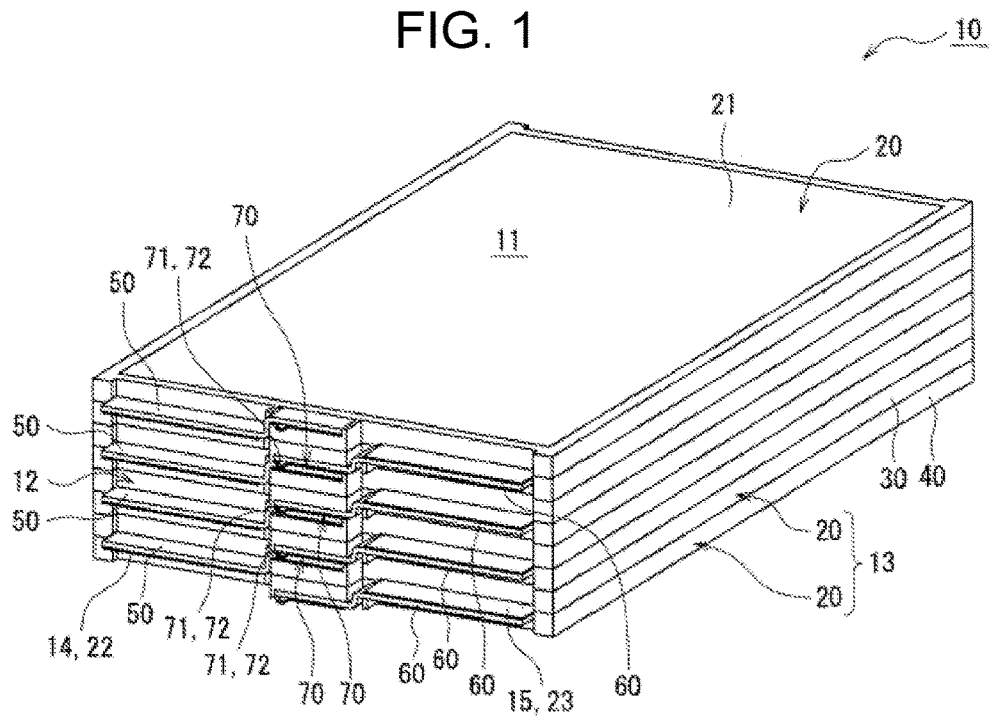
FIG. 1 is a perspective view of an assembled battery in accordance with an example of an exemplary embodiment.

Hereinafter, one example of an exemplary embodiment is described in detail.

Drawings referred to in the description of the exemplary embodiment are schematically shown. Dimension ratios of component elements drawn in the drawings may not be different from actual ones. Specific dimension ratios and the like should be determined with reference to the following description.

Assembled battery 10 that is an example of an exemplary embodiment is described in detail with reference to FIGS. 1 to 6.

Figure 2:
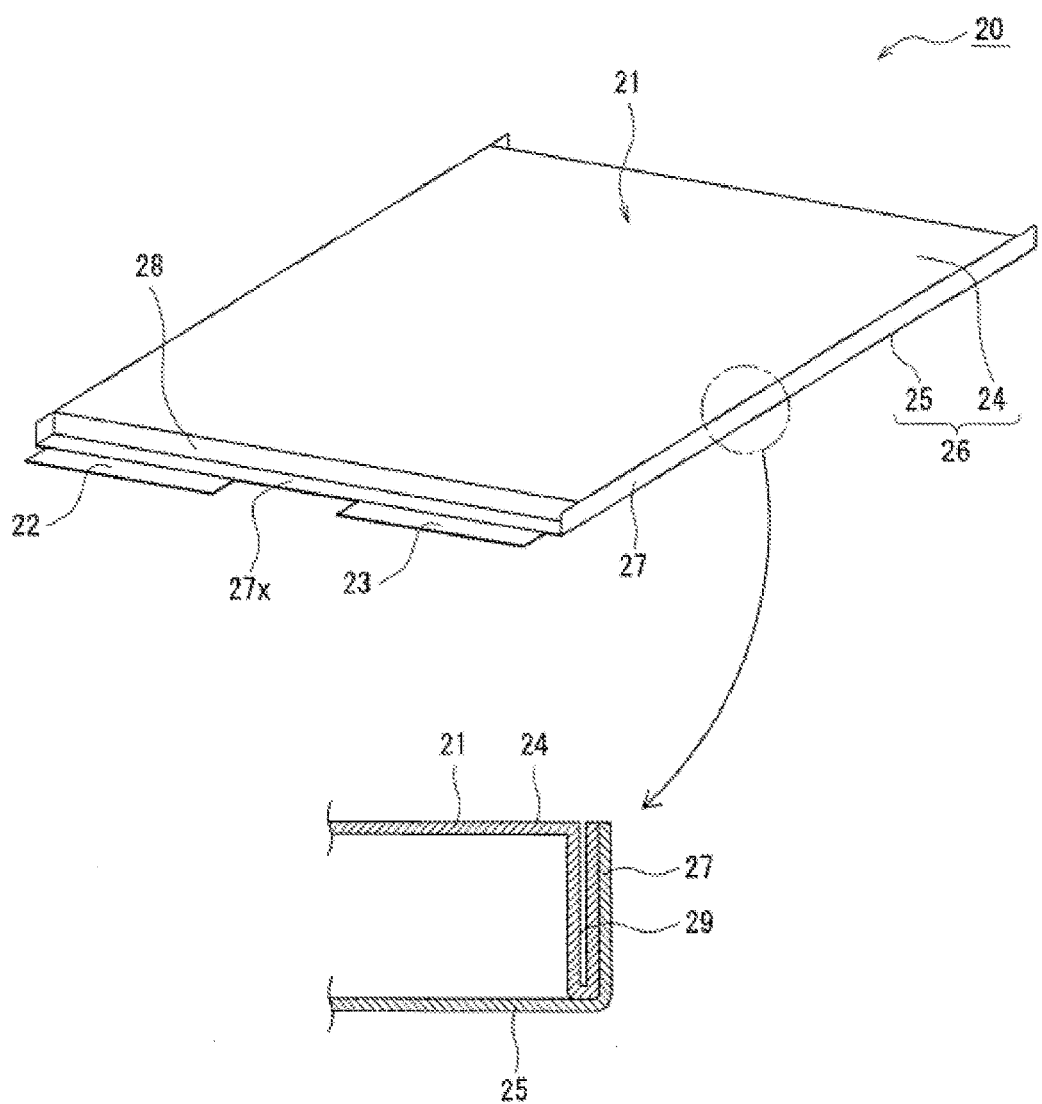
FIG. 2 is a perspective view of a unit cell constituting the assembled battery in accordance with the example of the exemplary embodiment.
Figure 3:
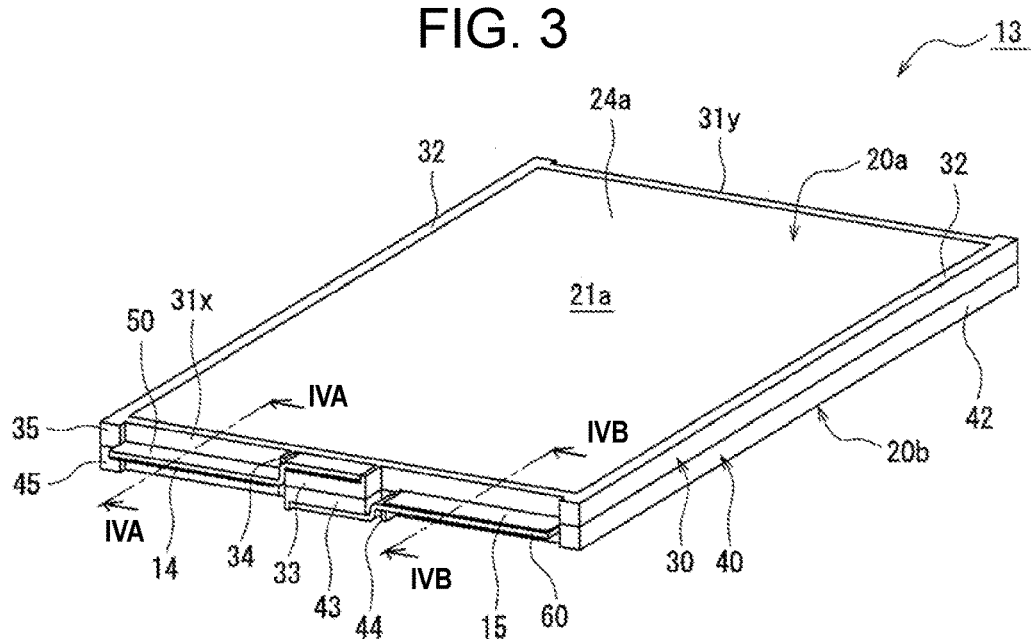
FIG. 3 is a perspective view showing a parallel block of a cell stack in accordance with the example of the exemplary embodiment.
Figure 4A:
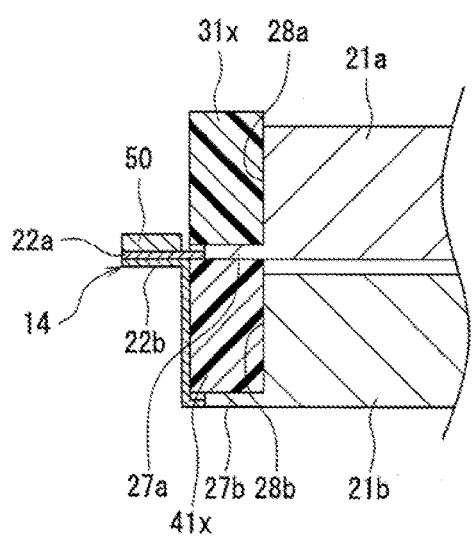
FIG. 4A is a sectional view taken on line IVA-IVA of FIG. 3.
Figure 4B:
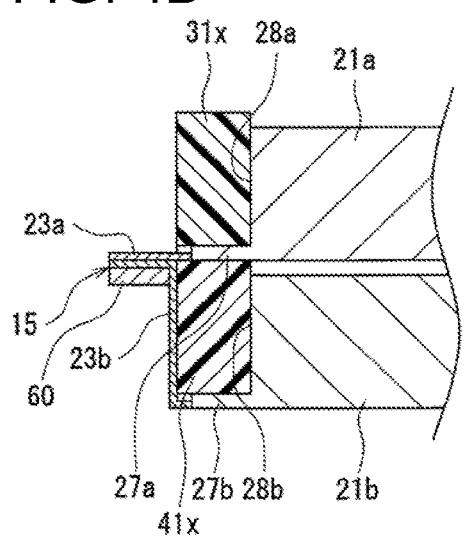
FIG. 4B is a sectional view taken on line IVB-IVB of FIG. 3.
Figure 5:
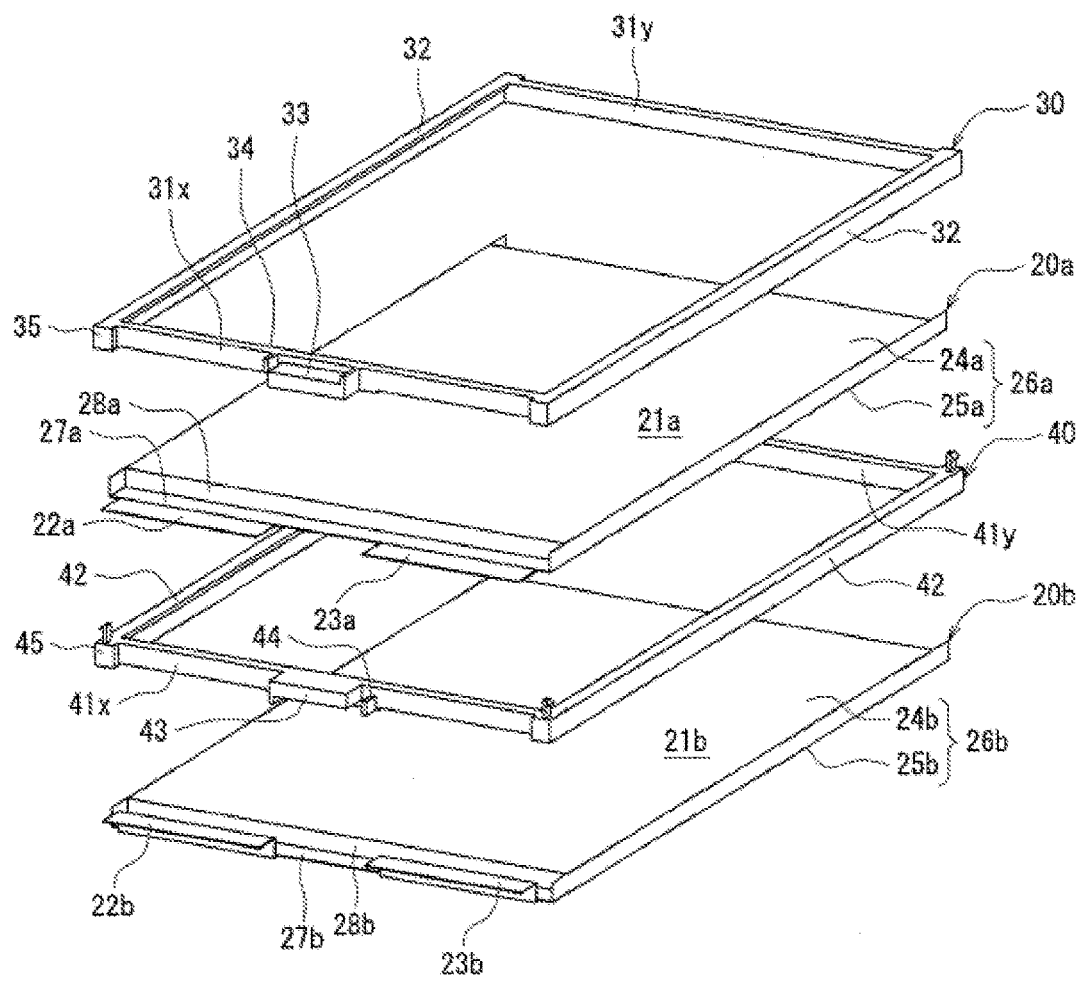
FIG. 5 is an exploded perspective view of the assembled battery (parallel block) in accordance with the example of the exemplary embodiment.
Figure 5:
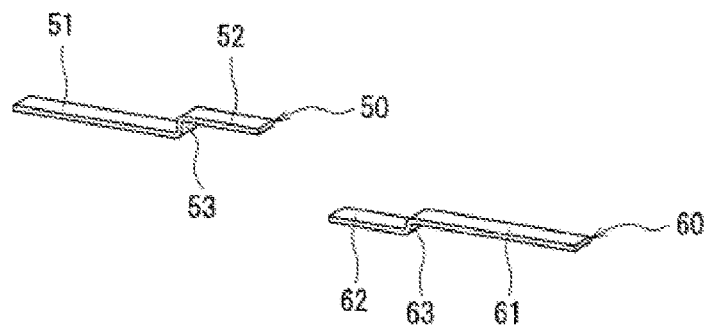
Figure 6:
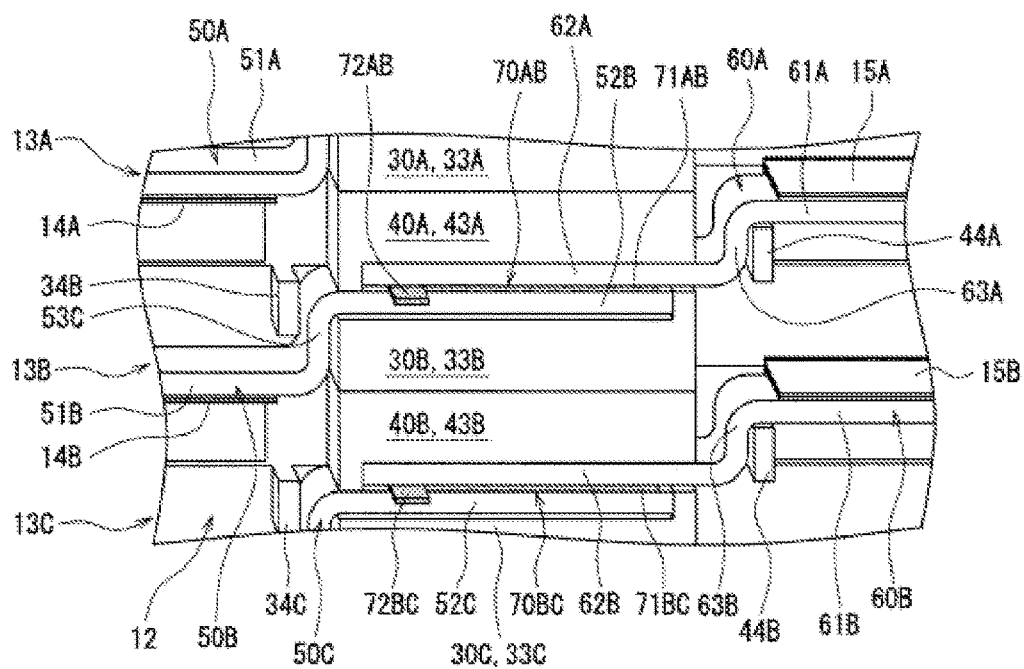
FIG. 6 is an enlarged view of a principal part of the assembled battery in accordance with the example of the exemplary embodiment.

FIG. 1 is a perspective view showing the entire assembled battery 10, and FIG. 2 is a perspective view showing unit cell 20 constituting assembled battery 10 (also showing a cross-section of a part surrounded by an alternate long and short dashed lines). FIGS. 3 to 5 show parallel block 13 of cell stack 11. FIG. 6 is an enlarged view showing connection portion 70 between positive electrode-side bus bar 50 and negative electrode-side bus bar 60, and the vicinity thereof.

As shown in FIG. 1, assembled battery 10 includes cell stack 11 formed by stacking a plurality of unit cells 20 facing in the same direction; positive electrode-side bus bars 50 connected to positive electrode tabs 22 of unit cells 20, respectively; and negative electrode-side bus bars 60 connected to negative electrode tabs 23 of unit cells 20, respectively. Assembled battery 10 is formed by connecting positive electrode-side bus bar 50, which is connected to positive electrode tab 22 of one unit cell 20 in adjacent unit cells 20 of cell stack 11, and negative electrode-side bus bars 60, which is connected to negative electrode tab 23 of the other unit cell 20, to each other on one of the surfaces of cell stack 11.

In this exemplary embodiment, cell stack 11 includes a plurality of parallel blocks 13. Parallel block 13 includes at least two adjacent unit cells 20 that are connected in parallel. Parallel block 13 includes positive electrode tab stack portion 14 and negative electrode tab stack portion 15. Positive electrode tab stack portion 14 is formed by overlaying positive electrode tabs 22 of unit cells 20 constituting the block, and negative electrode tab stack portion 15 is formed by overlaying negative electrode tabs 23 of the unit cells 20. Positive electrode-side bus bar 50 is connected to positive electrode tab stack portion 14, and negative electrode-side bus bar 60 is connected to negative electrode tab stack portion 15, respectively.

Assembled battery 10 is formed by connecting a plurality of parallel blocks 13 in series by using positive electrode-side bus bars 50 and negative electrode-side bus bars 60. That is to say, the connection mode of unit cells 20 in assembled battery 10 is series-parallel connection, which is combination of series connection and parallel connection. However, assembled battery 10 may have a structure which does not have parallel connection between unit cells 20 and does not have parallel block 13. In this case, each positive electrode-side bus bar 50 is electrically connected to only one positive electrode tab 22 of one unit cell 20, and each negative electrode-side bus bar 60 is electrically connected to only one negative electrode tab 23 of unit cell 20. Each bus bar connects each unit cell 20 constituting cell stack 11 in series.

Assembled battery 10 has, for example, a substantially rectangular parallelepiped shape. Assembled battery 10 extends longer in the longitudinal direction than in the lateral direction, and satisfies "length in the vertical direction<length in the lateral direction<length in the longitudinal direction." In the present specification, the longitudinal direction of assembled battery 10 and its configuration means a direction in which positive electrode tab 22 and negative electrode tab 23 are pulled out from main body 21 of unit cell 20. The vertical direction means a direction in which unit cells 20 are stacked on each other (stacking direction). The lateral direction means a direction perpendicular to the longitudinal direction and the vertical direction. The length in the vertical direction of assembled battery 10 is mainly determined by the thickness of unit cell 20 constituting cell stack 11 and the number of stacks of unit cells 20. Increase in the number of stacks increase the length in the vertical direction. Assembled battery 10 includes, for example, a case covering the surrounding of cell stack 11, and output terminal from which electric power is taken out from assembled battery 10 (both are not shown in the drawings), and the like.

Although details are described in later, connection portion 70 between positive electrode-side bus bar 50 and negative electrode-side bus bar 60 is an electric connection portion of parallel blocks 13. It is suitable that a plurality of connection portions 70 is arranged in the vertical direction that is the stacking direction of unit cells 20 on side surface 12 that is one surface of cell stack 11. Side surface 12 of cell stack 11 is one end face in the longitudinal direction along the vertical direction. Furthermore, it is suitable that assembled battery 10 includes conductive member 71 sandwiched and fixed between positive electrode-side bus bar 50 and negative electrode-side bus bar 60. Conductive member 71 has voltage-monitoring terminal unit 72 projecting from between each bus bar.

As shown in FIG. 2, unit cell 20 constituting assembled battery 10 includes flat main body 21, positive electrode tab 22 and negative electrode tab 23. Positive electrode tab 22 is pulled out from a first end side in the lateral direction of side surface 28 that is a first surface of main body 21. Negative electrode tab 23 is pulled out from a second end side in the lateral direction of side surface 28 of main body 21. Unit cell 20 is a laminated cell including housing 26 composed of two laminate films 24 and 25. Hereinafter, a laminate film 24 side is defined as an "upper" side, and a laminate film 25 side is defined as a "lower" side. Laminate films 24 and 25 are preferably a film including a metal layer, and resin layers formed on the metal layer. The metal layer is, for example, an aluminum layer and has a function to prevent permeation of water. Note here that unit cell 20 is not limited to a laminated cell, and may be, for example, a rectangular cell having a rectangular-shaped metallic case.

Unit cell 20 is a secondary battery, for example, a lithium ion secondary battery. Unit cell 20 includes, for example, a power generating element including an electrode body and an electrolyte, and housing 26 for housing the power generating element. One example of the electrode body is a wound-type electrode body formed by winding a positive electrode and a negative electrode with a separator interposed therebetween. Positive electrode tab 22 is connected to the positive electrode, and negative electrode tab 23 is connected to the negative electrode, respectively. Housing 26 has main body 21 and seal portion 27. The power generating element is housed in main body 21. In the example shown in FIG. 2, flat and substantially rectangular parallelepiped main body 21 is formed in laminate film 24 constituting housing 26. Main body 21 is formed by, for example, subjecting laminate film 24 to drawing such that laminate film 24 protrudes toward the opposite side to laminate film 25. Seal portion 27 joins (for example, heat-seals) the edge portions of laminate films 24 and 25. Seal portion 27 is formed around main body 21.

In this exemplary embodiment, seal portion 27 formed along the longitudinal direction of unit cell 20 is bent upward so as to be overlapped to side surface 29 that is an end face in the lateral direction of main body 21. It is preferable that the width of seal portion 27 is the same as or somewhat shorter than the length in the vertical direction of side surface 29. Bending seal portion 27 upward allows, for example, reinforcement of main body 21 and reduction in size of assembled battery 10.

Positive electrode tab 22 and negative electrode tab 23 are pulled out from the same surface (side surface 28) of main body 21 as mentioned above. Side surface 28 is an end face in the longitudinal direction of main body 21 and is along the thickness direction of unit cell 20. Each tab passes through seal portion 27 (hereinafter, also referred to as "seal portion 27x" as distinguished from the other portions of seal portion 27) extending in the longitudinal direction from the lower part of side surface 28, and extends from the tip end of seal portion 27x in the longitudinal direction (one end portion in the longitudinal direction). Seal portion 27x is formed substantially perpendicular to side surface 28, for example, in a state in which each tab is sandwiched between laminate films 24 and 25.

Positive electrode tab 22 and negative electrode tab 23 are thin-plate conductive members, and arranged side by side in the lateral direction of unit cell 20. Between positive electrode tab 22 and negative electrode tab 23, space is provided so that connection portion 70 of the bus bars can be formed. It is preferable that each tab has the same shape and same dimension in at least a portion extending from the tip end of seal portion 27x to the outside of housing 26 (hereinafter, also referred to as an "exposed portion"). The length of each tab in the lateral direction is less than 50% and preferably 20% to 40% of the length of main body 21 in the lateral direction. The length of the exposed portion of each tab in the longitudinal direction is a length that does not hinder the connection between the exposed portion and each bus bar. For example, the length is substantially equal to the width of each bus bar.

A shape of the exposed portion of each tab of unit cell 20 (unit cell 20b) disposed in the lower side of parallel block 13 is different from that of unit cell 20 (unit cell 20a) disposed in the upper side of parallel block 13 (see, for example, FIG. 5). As described later in detail, positive electrode tab 22b and negative electrode tab 23b of unit cell 20b are bent upward in the vicinity of seal portion 27b, and bent again toward one side of the longitudinal direction (opposite side to main body 21b). The necessary length of each tab of unit cell 20 is different depending upon the number of parallel connections and the like. Therefore, a plurality of unit cells 20 in which the length of the exposed portion of each tab is the same as each other is prepared, and the exposed portion may be appropriately cut depending on the number of parallel connections so as to produce unit cells 20a and 20b, and the like. Alternatively, after each tab stack portion is formed, an unnecessary exposed portion may be cut.

Hereinafter, the configuration of assembled battery 10 is further described appropriately with reference to FIGS. 3 to 6.

In FIGS. 3 to 5, among two unit cells 20 constituting parallel block 13, unit cell 20 disposed in the upper side is defined as "unit cell 20a", and unit cell 20 disposed in the lower side is defined as "unit cell 20b", and reference marks a and b are given to constituent elements of unit cells 20a and 20b, respectively. In FIG. 6, stacked parallel blocks 13 are defined as "parallel blocks 13A, 13B, and 13C" sequentially from the top, and reference marks A, B, and C are given to constituent elements of parallel blocks 13A, 13B, and 13C, respectively.

Cell stack 11 is formed of a plurality of unit cells 20 whose main bodies 21 have the same shape and the same dimension. The number of unit cells 20 constituting cell stack 11 is not particularly limited, but it is preferably four or more. Cell stack 11 illustrated in FIG. 1 includes eight unit cells 20. Cell stack 11 includes four parallel blocks 13. Each parallel block 13 is formed by connecting two each of unit cells 20 in parallel. Cell stack 11 is formed by stacking a plurality of unit cells 20 in the same direction as mentioned above. Specifically, unit cells 20 are stacked in a state in which each side surface 28 of each main body 21 from which positive electrode tab 22 and negative electrode tab 23 are pulled out faces the same direction, and positions of both end portions in the lateral direction and both end portions in the longitudinal direction are allowed to coincide. Each unit cell 20 is stacked in a state in which laminate film 24 provided with main body 21 faces upward.

As shown in FIGS. 3 to 5, parallel block 13 includes two unit cells 20a and 20b which are respectively provided with positive electrode tab stack portion 14 and negative electrode tab stack portion 15 and which are connected to each other in parallel. As mentioned above, unit cells 20a and 20b are stacked in the same direction. Positive electrode tabs 22a and 22b and negative electrode tabs 23a and 23b, which are respectively arranged in the vertical direction, are electrically connected to each other to form positive electrode tab stack portion 14 and negative electrode tab stack portion 15, respectively. Parallel block 13 includes positive electrode-side bus bar 50 connected to positive electrode tab stack portion 14 and negative electrode-side bus bar 60 connected to negative electrode tab stack portion 15. Furthermore, it is suitable that parallel block 13 includes frame bodies 30 and 40 attached to unit cells 20a and 20b, respectively.

Positive electrode tab 22a and negative electrode tab 23a of unit cell 20a straightly extend in the longitudinal direction from the tip end of seal portion 27a to the outside of housing 26. On the other hand, positive electrode tab 22b of unit cell 20b is bent toward a positive electrode tab 22a side of unit cell 20a in the vicinity of seal portion 27b and extends along the vertical direction to a position that is in contact with positive electrode tab 22a. Positive electrode tab 22b is bent toward the opposite side to main body 21a in a position that is in contact with the lower surface of positive electrode tab 22a, and extends from the bent portion to the tip portion along the longitudinal direction substantially in parallel with positive electrode tab 22a. Then, the lower surface of positive electrode tab 22a and the upper surface of positive electrode tab 22b are joined to each other to form positive electrode tab stack portion 14.

Negative electrode tab 23b of unit cell 20b is bent toward a negative electrode tab 23a side of unit cell 20a in the vicinity of seal portion 27b and extends along the vertical direction to a position that is in contact with negative electrode tab 23a. Negative electrode tab 23b is bent toward the opposite side to main body 21a in a position that is in contact with the lower surface of negative electrode tab 23a, and extends from the bent portion to the tip portion along the longitudinal direction substantially in parallel with negative electrode tab 23a. Then, the lower surface of negative electrode tab 23a and the upper surface of negative electrode tab 23b are joined to each other to form negative electrode tab stack portion 15. It is suitable that each tab stack portion is arranged in the lateral direction in substantially the middle in the vertical direction of parallel block 13.

Positive electrode tab stack portion 14 is formed by, for example, overlaying and welding positive electrode tab 22a of unit cell 20a and positive electrode tab 22b of unit cell 20b to each other. The welding method is not particularly limited. Examples of the welding method include ultrasonic welding and laser welding. For example, by overlaying and ultrasonic welding of positive electrode tabs 22a, 22b and positive electrode-side bus bar 50, positive electrode tab stack portion 14 can be formed and simultaneously positive electrode-side bus bar 50 can be connected to positive electrode tab stack portion 14. Also, negative electrode tab stack portion 15 can be formed by stacking and welding negative electrode tab 23a and negative electrode tab 23b to each other. Note here that the tab stack portion can be formed by methods other than welding, for example, by fastening tabs by using a fastening member such as a bolt.

Frame bodies 30 and 40 surround all sides of main bodies 21a and 21b, respectively, and have, for example, functions of protecting unit cells 20a and 20b, and the binding cells to each other. Frame body 30 has two transverse crosspieces 31x and 31y, and two longitudinal crosspieces 32. Frame body 30 is attached from the upper side of unit cell 20a. Transverse crosspieces 31x and 31y are mounted on seal portions 27a formed on both end portions in the longitudinal direction of unit cell 20a and disposed along the end face (side surface 28) in the longitudinal direction of main body 21a. Longitudinal crosspieces 32 are disposed along the end faces (side surface 29) in the lateral direction of main body 21a. Transverse crosspieces 31x and 31y are provided with a slit (not shown) for avoiding interference with the end portions in the longitudinal direction of the bent seal portion 27.

Both end portions in the lateral direction (both end portions in the longitudinal direction) of transverse crosspieces 31x and 31y are provided with engagement portions 35 to be used for bonding with respect to frame body 40.

Similar to frame body 30, frame body 40 also has two transverse crosspieces 41x and 41y, and two longitudinal crosspieces 42. Frame body 40 is also attached from the upper side of unit cell 20b. Engagement portions 45 provided on both end portions in the lateral direction of transverse crosspieces 41x and 41y are inserted into engagement portions 35 of frame body 30. Thus, the frame bodies are bonded. For example, engagement portion 45 has a hook, and engagement portion 35 has a recess portion which the hook is inserted into and hooked on. It is suitable that the length of each crosspiece of frame body 30 in the vertical direction is larger than the thickness (the length in the vertical direction) of main body 21a, and that the upper end face of each crosspiece is located upper than the upper end face of main body 21a. Longitudinal crosspiece 32 has a cross-section having, for example, substantially L-shape, and a part of longitudinal crosspiece 32 projects onto main body 21a. Similar to frame body 30, also in frame body 40, the upper end face of each crosspiece is located upper than the upper end face of main body 21b, and a part of longitudinal crosspiece 42 projects onto main body 21b.

In this exemplary embodiment, unit cell 20a is sandwiched between frame bodies 30 and 40 to be bonded to each other, from the upper and lower parts. Unit cell 20b is sandwiched between frame body 40 and the frame body 30 of another parallel block 13 that is disposed in the lower side. In the example shown in FIG. 5, only engagement portion 45 is provided with a hook. However, engagement portion 35 may be also provided with a hook and the like capable of being inserted into engagement portion 45 of frame body 40 disposed in the upper side.

In the middle in the lateral direction (middle in the longitudinal direction) of transverse crosspiece 31x, it is preferable that support portion 33 and press portion 34 for holding positive electrode-side bus bar 50 are provided. Support portion 33 protrudes in the longitudinal direction and is formed in a block shape. A part of positive electrode-side bus bar 50 extending from a first end side to the middle in the lateral direction is mounted on support portion 33. It is suitable that the part of positive electrode-side bus bar 50 (second connection portion 52) mounted on support portion 33 is located in the upper end portion of parallel block 13. Press portion 34 is a protrusion provided nearer to the first end side of transverse crosspiece 31x in the lateral direction than support portion 33. Press portion 34 is disposed with a gap between press portion 34 and support portion 33, so that positive electrode-side bus bar 50 can be inserted into the gap. Press portion 34, together with support portion 33, restricts the movement of positive electrode-side bus bar 50 in the lateral direction.

Similar to transverse crosspiece 31x, in the middle in the lateral direction of transverse crosspiece 41x, it is preferable that support portion 43 and press portion 44 are provided. Support portion 43 is formed in a block shape, and press portion 44, together with support portion 43, restricts the movement of negative electrode-side bus bar 60 in the lateral direction. Support portion 43 and support portion 33 are arranged in the vertical direction. It is suitable that a part of negative electrode-side bus bar 60 (second connection portion 62) extending from a second end side to the middle in the lateral direction is disposed below support portion 43, and is located in the lower end portion of parallel block 13. Press portion 44 is provided nearer to the second end side of transverse crosspiece 41x in the lateral direction than support portion 43. Press portion 44 is disposed with a gap between press portion 44 and support portion 43, so that negative electrode-side bus bar 60 can be inserted into the gap.

Positive electrode-side bus bar 50 and negative electrode-side bus bar 60 are metallic conductive members, and are connected to positive electrode tab stack portion 14 and negative electrode tab stack portion 15, respectively, for example, by welding. Positive electrode-side bus bar 50 includes first connection portion 51 (positive electrode-side first connection portion), second connection portion 52 (positive electrode-side second connection portion), and coupling portion 53 (positive electrode-side coupling portion). Positive electrode-side bus bar 50 is preferably formed by bending one metal plate. First connection portion 51 is a portion to be connected to positive electrode tab stack portion 14. Second connection portion 52 is a portion which extends substantially in parallel with first connection portion 51 and is connected to negative electrode-side bus bar 60 of another parallel block 13. Positive electrode-side bus bar 50 has, for example, a constant width over the entire length. First connection portion 51 is longer than second connection portion 52. Coupling portion 53 is a portion for coupling each connection portion, and forms a stepped portion between each connection portion.

First connection portion 51 extends from a first end of coupling portion 53, and second connection portion 52 extends from a second end of coupling portion 53, respectively. First connection portion 51 and second connection portion 52 extends in the opposite directions to each other. It is suitable that coupling portion 53 is formed by bending a metal plate so as to be substantially perpendicular to the first and second connection portions. In this exemplary embodiment, first connection portion 51 is mounted and welded to the upper surface of positive electrode tab stack portion 14, and second connection portion 52 is mounted on the upper surface of support portion 33 of frame body 30. That is to say, first connection portion 51 is located in substantially the middle of parallel block 13, and second connection portion 52 is located in the upper end portion of parallel block 13. Coupling portion 53 forms a stepped portion between the connection portions.

Similar to positive electrode-side bus bar 50, negative electrode-side bus bar 60 includes first connection portion 61 (negative electrode-side first connection portion), second connection portion 62 (negative electrode-side second connection portion), and coupling portion 63 (negative electrode-side coupling portion). Negative electrode-side bus bar 60 is preferably formed by bending one metal plate. Second connection portion 62 is connected to positive electrode-side bus bar 50 of another parallel block 13. In this exemplary embodiment, first connection portion 61 is welded to the lower surface of negative electrode tab stack portion 15, and second connection portion 62 is disposed below support portion 43. That is to say, first connection portion 61 is located in substantially the middle in the vertical direction of parallel block 13, and second connection portion 62 is located in the lower end portion of parallel block 13. Coupling portion 63 forms a stepped portion between each connection portion.

Positive electrode-side bus bar 50 and negative electrode-side bus bar 60 may have different shapes and dimensions from each other, but preferably have the same shape and dimension as each other. Positive electrode-side bus bar 50 and negative electrode-side bus bar 60 are different from each other only in the direction in which they are attached to cell stack 11. A member used as positive electrode-side bus bar 50 can be used for negative electrode-side bus bar 60. In this case, assembled battery 10 can be formed by using one type of bus bar, thus enabling the number of components to be reduced.

As mentioned above, assembled battery 10 includes cell stack 11 including a plurality of parallel blocks 13. Assembled battery 10 can be formed by connecting adjacent parallel blocks 13 in series. In assembled battery 10, each tab of each unit cell 20 constituting parallel block 13 is pulled out in the same direction, and each bus bar is attached to the same surface of cell stack 11. As compared with a case where bus bars are attached to a plurality of surfaces of cell stack 11, productivity becomes more excellent and reduction in size of assembled battery 10 and the like can be achieved because, for example, connection work and the like can be carried out on one surface.

As shown in FIG. 6, adjacent parallel blocks 13A and 13B are connected in series using positive electrode-side bus bar 50B and negative electrode-side bus bar 60A. That is to say, negative electrode-side bus bar 60A connected to negative electrode tab stack portion 15A of parallel block 13A and positive electrode-side bus bar 50B connected to positive electrode tab stack portion 14B of parallel block 13B are connected to each other. For example, second connection portion 62A of negative electrode-side bus bar 60A and second connection portion 52B of positive electrode-side bus bar 50B are overlaid and welded to each other to form connection portion 70AB. In this exemplary embodiment, connection portion 70AB is formed in an interface between parallel blocks 13A and 13B. Connection portion 70AB is provided with conductive member 71AB that is sandwiched between negative electrode-side bus bar 60A and positive electrode-side bus bar 50B. Second connection portion 52B and second connection portion 62A are electrically connected to each other via conductive member 71AB.

Adjacent parallel blocks 13B and 13C are connected in series using positive electrode-side bus bar 50C and negative electrode-side bus bar 60B. That is to say, negative electrode-side bus bar 60B connected to negative electrode tab stack portion 15B of parallel block 13B and positive electrode-side bus bar 50C connected to positive electrode tab stack portion (not shown in FIG. 6) of parallel block 13C are connected to each other. For example, connection portion 70BC is formed in the interface portion between parallel block 13B and 13C by welding second connection portion 62B of negative electrode-side bus bar 60B and second connection portion 52C of positive electrode-side bus bar 50C to each other via conductive member 71BC.

It is suitable that connection portions 70AB and 70BC are arranged in the vertical direction in the middle in the lateral direction on side surface 12 of cell stack 11. In this exemplary embodiment, each tab stack portion of parallel blocks 13A, 13B, and 13C is provided so as not to be provided in the middle in the lateral direction on side surface 12. Consequently, space is secured in the middle so that connection portions 70AB and 70BC can be formed and conductive members 71AB and 71BC can be disposed. As illustrated in FIG. 1, it is preferable that all the connection portions 70 are arranged in the vertical direction. According to the configuration, connection portion 70 can be formed in an extremely limited range. For example, when laser welding is carried out, connection portion 70 can be formed easily by scanning with welding laser light in the vertical direction, or by moving cell stack 11 in the vertical direction with irradiation spot of laser light fixed.

It is suitable that connection portion 70AB (second connection portion 52B, second connection portion 62A) is sandwiched between each support portion of frame bodies 30A and 40A of parallel block 13A and each support portion of frame bodies 30B and 40B of parallel block 13B from the upper and lower sides. In the example shown in FIG. 1, positive electrode-side bus bar 50, conductive member 71, negative electrode-side bus bar 60, frame body 40, and frame body 30 are stacked sequentially in this order along the vertical direction. With such a stacked structure, connection portion 70 is pressed strongly from the upper and lower sides. Consequently, for example, contact failure and the like, of connection portion 70 does not easily occur, and an excellent connecting state can be maintained for a long time.

Conductive members 71AB and 71BC are thin-plate members respectively disposed between each bus bar in connection portions 70AB and 70BC. As illustrated in FIG. 1, it is suitable that all the connection portions 70 are provided with conductive members 71. Positive electrode-side bus bars 50 and negative electrode-side bus bars 60 are not directly linked to each other, and conductive members 71 are interposed therebetween. In the example shown in FIG. 1, conductive member 71 disposed in the uppermost part is connected only to positive electrode-side bus bar 50, and conductive member 71 disposed in the lowermost part is connected only to negative electrode-side bus bar 60.

Conductive member 71AB has voltage-monitoring terminal unit 72AB protruding from between positive electrode-side bus bar 50B and negative electrode-side bus bar 60A. Voltage-monitoring terminal unit 72AB extends in the longitudinal direction from, for example, a first end side of the lateral direction of connection portion 70AB. Voltage-monitoring terminal unit 72AB functions as a terminal for measuring a voltage of a serial block composed of parallel blocks 13A and 13B. Similarly, voltage-monitoring terminal unit 72BC of conductive member 71BC functions as a terminal for measuring a voltage of a serial block composed of parallel blocks 13B and 13C. As illustrated in FIG. 1, it is suitable that each voltage-monitoring terminal unit 72 is arranged in the vertical direction. When voltage-monitoring terminal units 72 are arranged in line, for example, it is possible to suppress complication of the connection structure between each terminal and a voltage measuring unit (not shown).

It is suitable that conductive member 71 further functions as a fuse. Conductive member 71 is formed of, for example, a metal material whose melting point is lower than that of a metal material constituting each bus bar (low-melting point alloy and the like). Conductive member 71 is melted to cut off an electric current when an excessively large amount of electric current flows. Note here that a conductive member that functions as a fuse may be used in addition to the conductive member for monitoring a voltage.

The above-mentioned exemplary embodiment describes a configuration in which conductive members 71 are disposed to all connection portions 70. However, conductive members 71 may be disposed only in a part of connection portions 70. Alternatively, a configuration in which conductive member 71 is not provided and each bus bar is welded directly may be employed. Furthermore, conductive member 71 may be used only as a fuse without having voltage-monitoring terminal unit 72.

Figure 7:
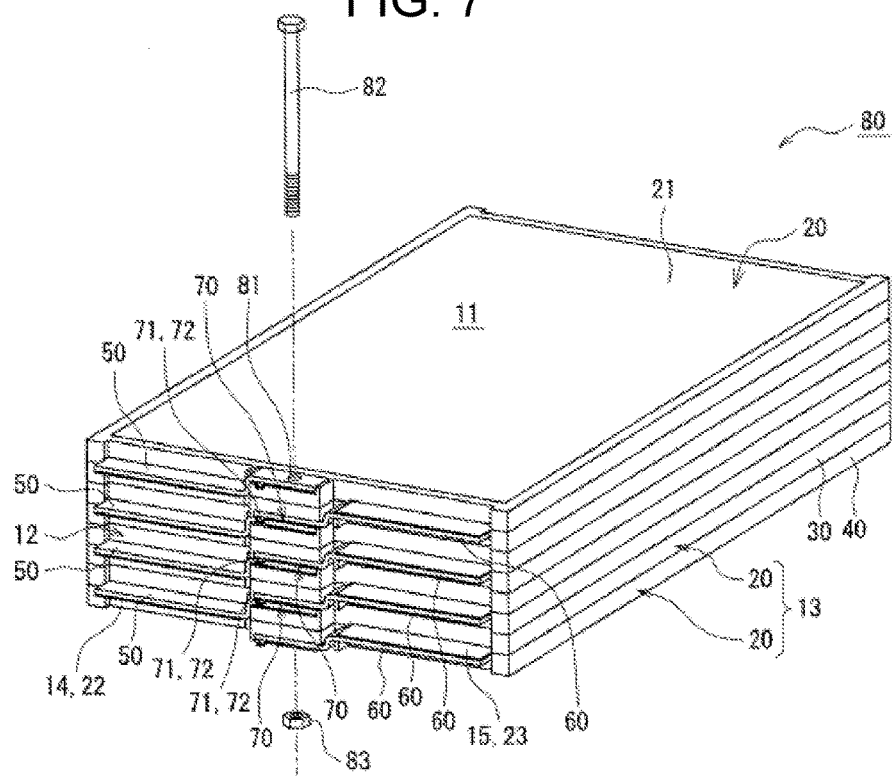
FIG. 7 is a view showing an assembled battery in accordance with another example of the exemplary embodiment.

The above-mentioned exemplary embodiment describes a configuration in which connection portion 70 is formed by welding. However, as shown in FIG. 7, a plurality of connection portions 70 can be formed by using one bolt 82. In the example shown in FIG. 7, each member constituting a stacked structure in which of each bus bar, conductive members 71, and each support portion of frame bodies 30 and 40 are stacked on each other in the vertical direction is bonded by using bolt 82 and nut 83. Bolt 82 penetrates through the stacked structure, and nut 83 is attacked to the axis of bolt 82. Thus, positive electrode-side bus bars 50 and negative electrode-side bus bars 60 are brought into strong contact with each other via conductive members 71 to form connection portions 70. Each member constituting the stacked structure is provided with through hole 81, through which bolt 82 can pass, in the vertical direction.

Bolt 82 and nut 83 are made of, for example, an insulating material, or have an insulating coating layer on a surface that is brought into contact with the bus bar or the like. Alternatively, the periphery of through holes 81 of each bus bar and conductive member 71 may be made of an insulating material, or have an insulating coating layer on the periphery of through hole 81. According to an aspect illustrated in FIG. 7, a plurality of connection portions 70 is formed using one bolt 82, that is, a plurality of parallel blocks 13 can be connected in series at one time.

Figure 8:
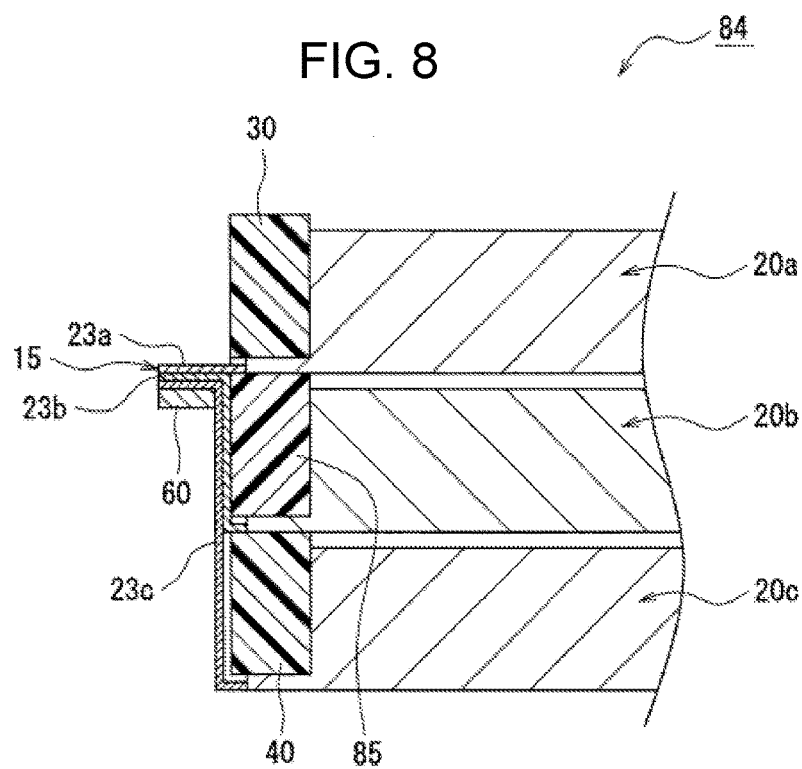
FIG. 8 is a sectional view showing an assembled battery (parallel block) in accordance with another example of the exemplary embodiment.

The above-mentioned exemplary embodiment illustrates parallel block 13 in which two unit cells 20a and 20b are connected in parallel. However, as shown in FIG. 8, parallel block 84 may be formed by connecting three unit cells 20a, 20b, and 20c in parallel. In parallel block 84, negative electrode tab stack portion 15 is formed by stacking three negative electrode tabs 23a, 23b, and 23c, and negative electrode-side bus bar 60 is connected to the tab stack portion. In an example shown in FIG. 8, negative electrode tab stack portion 15 is formed by allowing negative electrode tab 23a to extend straightly in the longitudinal direction, bending negative electrode tabs 23b and 23c toward a negative electrode tab 23a side, and overlaying negative electrode tabs 23b and 23c on negative electrode tab 23a. That is to say, in assembled battery 10, it is possible to change the number of unit cells 20 to be connected in parallel by changing the number of negative electrode tabs 23 constituting negative electrode tab stack portion 15, the bending form of negative electrode tab 23, and the like.

FIG. 8 shows negative electrode tab stack portion 15, but positive electrode tab stack portion 14 can be formed in the same configuration. In this case, each tab stack portion is arranged in the lateral direction of parallel block 84. For example, positive electrode-side bus bar 50 and negative electrode-side bus bar 60 in which coupling portions 53 and 63 have different lengths (the length of coupling portion 63 is longer than the length of coupling portion 53) are used, respectively. Note here that, for example, frame body 85, which does not have a support portion and a press portion, is attached to unit cell 20b disposed in the middle of parallel block 84.

Figure 9:
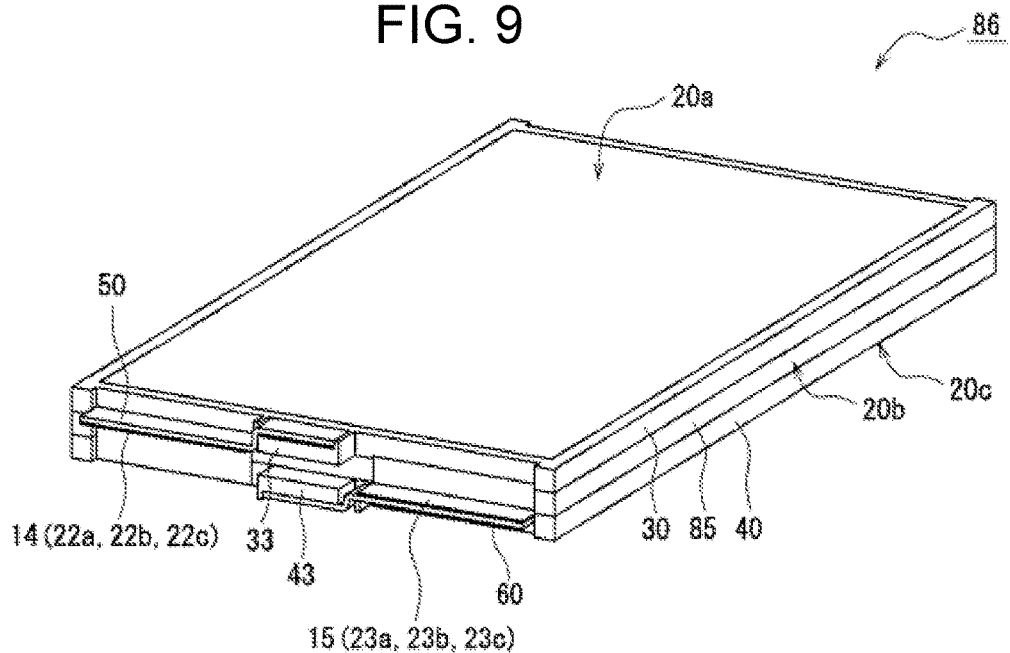
FIG. 9 is a perspective view showing an assembled battery (parallel block) in accordance with another example of the exemplary embodiment.

In parallel block 86 illustrated in FIG. 9, each tab stack portion is not arranged in the lateral direction, and positive electrode tab stack portion 14 is formed in the upper part than negative electrode tab stack portion 15. In an example shown in FIG. 9, negative electrode tab stack portion 15 is formed by allowing negative electrode tab 23c to extend straightly in the longitudinal direction, bending negative electrode tabs 23a and 23c toward a negative electrode tab 23c side, and overlaying negative electrode tabs 23a and 23b on negative electrode tab 23c. On the other hand, positive electrode tab stack portion 14 is formed by allowing positive electrode tab 22a to extend straightly in the longitudinal direction, bending positive electrode tabs 22b and 22c toward a positive electrode tab 22a side, and overlaying positive electrode tabs 22b and 22c on positive electrode tab 23a. When each tab stack portion is displaced in the vertical direction in this way, one bus bar can used in common by positive electrode-side bus bar 50 and negative electrode-side bus bar 60 (for example, the bus bar that is the same as in FIG. 3 can be used).

Figure 10:
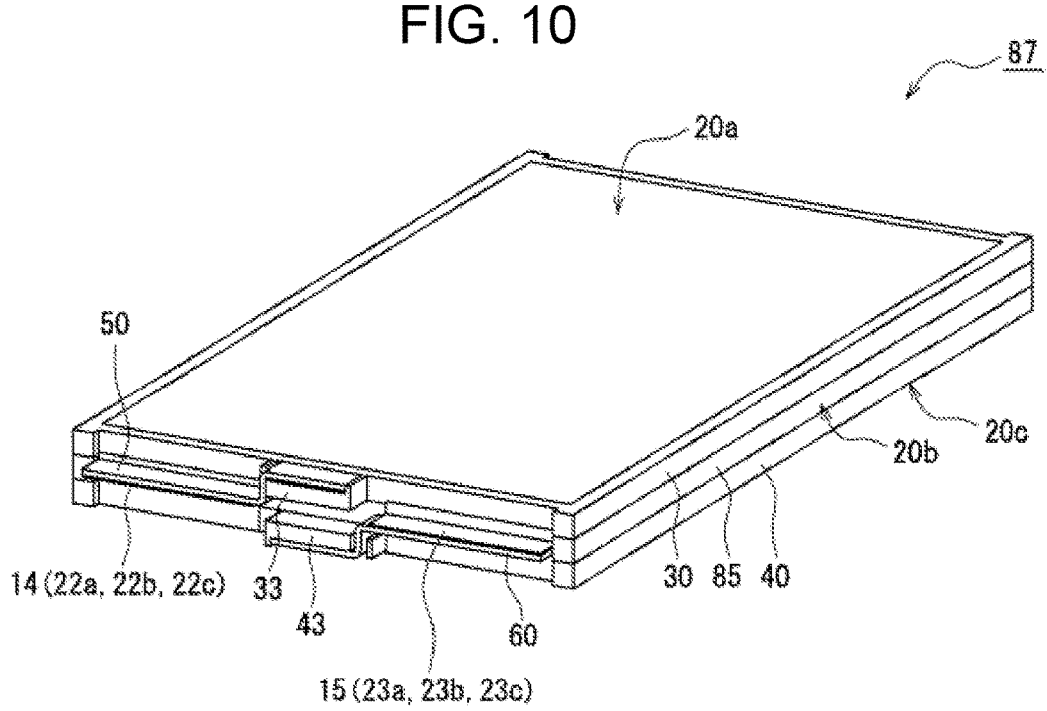
FIG. 10 is a perspective view of an assembled battery (parallel block) of in accordance with another example of the exemplary embodiment.

In parallel block 87 illustrated FIG. 10, each tab stack portion is arranged in the lateral direction in substantially the middle in the vertical direction of the block. In an example shown in FIG. 10, all the positive and negative electrode tabs have a bent shape. Specifically, positive electrode tab stack portions 14 and negative electrode tab stack portions 15 are formed, respectively, by bending each positive electrode tab and each negative electrode tab such that they are located substantially in the middle in the vertical direction of unit cell 20b, and overlaying each positive electrode tab and each negative electrode tab on each other. Forming each tab stack portion in substantially the middle in the vertical direction of parallel block 87, one bus bar can used in common by positive electrode-side bus bar 50 and negative electrode-side bus bar 60.

As mentioned above, in assembled battery 10 having the above-mentioned configuration, for example, each bas bar is disposed on one surface of cell stack 11, and connection work of each bus bar can be carried out in line along the vertical direction. In other words, assembled battery 10 have a simple structure and is easily assembled. In addition, assembled battery 10 can be formed so as to have a plurality of connection modes using one bus bar. It is possible to achieve design with a small number of components and a high degree of freedom of the connection mode of unit cells 20.

The invention claimed is:

1. An assembled battery comprising:
    unit cells each including a flat main body, a positive electrode tab disposed at a first end side in a lateral direction of the main body, and a negative electrode tab disposed a second end side in the lateral direction of the main body, the positive electrode tab and the negative electrode tab extending along a first surface of the main body and longitudinally away from the main body in a same direction;
    cell stack formed by stacking the unit cells facing in an identical direction;
    positive electrode-side bus bars each being connected to the positive electrode tab; and
    negative electrode-side bus bars each being connected to the negative electrode tab;
    wherein each of the positive electrode-side bus bar and the negative electrode-side bus bar has a first connection portion, a second connection portion and a coupling portion having a stepped portion connecting the first and second connect portions, the first connection portion and the second connection portion extending substantially parallel to each other,
    the first connection portion of each of the bus bars is disposed on at least a portion of the corresponding electrode tab, and
    in the unit cells that are adjacent to each other in the cell stack, the positive electrode-side bus bar connected to the positive electrode tab of a first unit cell of the unit cells and the negative electrode-side bus bar connected to the negative electrode tab of a second unit cell of the unit cells are connected to each other on a first surface of the cell stack.

2. The assembled battery according to claim 1,
    wherein the cell stack includes a plurality of parallel blocks each including at least two of the adjacent unit cells that are connected in parallel, each of the parallel blocks includes a positive electrode tab stack portion and a negative electrode tab stack portion, the positive electrode tab stack portion being formed by overlaying the positive electrode tabs of the unit cells constituting the parallel block, and the negative electrode tab stack portion being formed by overlaying the negative electrode tabs of the unit cells, and wherein in the parallel blocks that are adjacent to each other, the positive electrode-side bus bar connected to the positive electrode tab stack portion of a first parallel block, and the negative electrode-side bus bar connected to the negative electrode tab stack portion of a second parallel block are connected to each other.

3. The assembled battery according to claim 2, wherein the first connection portion of the positive electrode-side bus bars is connected to the positive electrode tab stack portion, and the second connection portion of the positive electrode-side bus bar is connected to the negative electrode-side bus bar, and the first connection portion negative electrode-side bus bar is connected to the negative electrode tab stack portion, and the second connection portion of the negative electrode-side bus bar is connected to the positive electrode-side bus bar.

4. The assembled battery according to claim 3, wherein the positive electrode-side bus bar and the negative electrode-side bus bar have identical shape and dimension.

5. The assembled battery according to claim 1, wherein the positive electrode-side bus bar and the negative electrode-side bus bar are connected to each other to form a connection portion, the connection portion is one of a plurality of connection portions, and the plurality of connection portions are arranged in a stacking direction of the unit cells on the first surface of the cell stack.

6. The assembled battery according to claim 1, further comprising a conductive member sandwiched between the positive electrode-side bus bar and the negative electrode-side bus bar, wherein the conductive member has a voltage-monitoring terminal unit protruding from between the positive electrode-side bus bar and the negative electrode-side bus bar.

7. The assembled battery according to claim 2, wherein the positive electrode-side bus bar and the negative electrode-side bus bar are connected to each other to form a connection portion, the connection portion is one of a plurality of connection portions, and the plurality of connection portions are arranged in a stacking direction of the unit cells on the first surface of the cell stack.

8. The assembled battery according to claim 3, wherein the positive electrode-side bus bar and the negative electrode-side bus bar are connected to each other to form a connection portion, the connection portion is one of a plurality of connection portions, and the plurality of connection portions are arranged in, a stacking direction of the unit cells on the first surface of the cell stack.

9. The assembled battery according to claim 4, wherein the positive electrode-side bus bar and the negative electrode-side bus bar are connected to each other to form a connection portion, the connection portion is one of a plurality of connection portions, and the plurality of connection portions are arranged in a stacking direction of the unit cells on the first surface of the cell stack.

10. The assembled battery according to claim 2, further comprising a conductive member sandwiched between the positive electrode-side bus bar and the negative electrode-side bus bar, wherein the conductive member has a voltage-monitoring terminal unit protruding from between the positive electrode-side bus bar and the negative electrode-side bus bar.

11. The assembled battery according to claim 3, further comprising a conductive member sandwiched between the positive electrode-side bus bar and the negative electrode-side bus bar, wherein the conductive member has a voltage-monitoring terminal unit protruding from between the positive electrode-side bus bar and the negative electrode-side bus bar.

12. The assembled battery according to claim 4, further comprising a conductive member sandwiched between the positive electrode-side bus bar and the negative electrode-side bus bar, wherein the conductive member has a voltage-monitoring terminal unit protruding from between the positive electrode-side bus bar and the negative electrode-side bus bar.

13. The assembled battery according to claim 5, further comprising a conductive member sandwiched between the positive electrode-side bus bar and the negative electrode-side bus bar, wherein the conductive member has a voltage-monitoring terminal unit protruding from between the positive electrode-side bus bar and the negative electrode-side bus bar.

* * * * *